(12) United States Patent
Panneerselvam et al.

(10) Patent No.: US 8,537,733 B1
(45) Date of Patent: Sep. 17, 2013

(54) DYNAMIC POWER MODE SWITCH IN A WIRELESS AD-HOC SYSTEM

(75) Inventors: Sivakumar Panneerselvam, Chennai (IN); Dhanasekaran Sathyamurthy, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/705,267

(22) Filed: Feb. 12, 2010

(51) Int. Cl.
  *G08C 17/00* (2006.01)

(52) U.S. Cl.
  USPC .......................................................... 370/311

(58) Field of Classification Search
  USPC .......................................................... 370/311
  See application file for complete search history.

(56) References Cited

U.S. PATENT DOCUMENTS

| | | |
|---|---|---|
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |
| 7,260,068 B2 | 8/2007 | Hsieh et al. |
| RE40,032 E | 1/2008 | van Bokhorst et al. |
| 7,457,271 B2 | 11/2008 | Donovan |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,804,849 B2 | 9/2010 | Mahany et al. |
| 7,864,720 B2 | 1/2011 | Jeyaseelan |
| 7,916,663 B2 | 3/2011 | Yee |
| 7,978,638 B2 | 7/2011 | Kim et al. |
| 7,995,507 B2 | 8/2011 | Singh et al. |
| 8,014,370 B2 | 9/2011 | Banerjea et al. |
| 8,023,522 B2 | 9/2011 | Gobriel et al. |
| 8,045,494 B2 | 10/2011 | Habetha et al. |
| 8,072,913 B2 | 12/2011 | Desai |

(Continued)

FOREIGN PATENT DOCUMENTS

| | | |
|---|---|---|
| EP | 2157739 | 2/2010 |
| WO | 2012078379 A1 | 6/2012 |

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications", *IEEE Std 802.11-2007 (Revision of IEEE Std 802.11-1999)* Section 11; http://standards.ieee.org/getieee802/download/802.11-2007.pdf. (Date Obtained from Internet Apr. 6, 2010) Jun. 12, 2007, pp. 468-517.

(Continued)

*Primary Examiner* — Albert T Chou
(74) *Attorney, Agent, or Firm* — DeLizio Gilliam, PLLC

(57) ABSTRACT

In ad-hoc wireless networks, functionality can be implemented to dynamically enable/disable an ad-hoc power save mode depending on whether or not the WLAN device is in a continuous traffic environment. The WLAN devices in the ad-hoc wireless network can use beacon frames to transmit a power mode switch request, to respond to a received power mode switch request (to indicate acceptance or rejection of the received power mode switch request), and to indicate a power mode switch status. The WLAN devices switch the power mode if all the WLAN devices in the ad-hoc wireless network accept the power mode switch request. Changing the power mode depending on the environment can improve power savings, data throughput, and reliability.

24 Claims, 9 Drawing Sheets

(56) References Cited

U.S. PATENT DOCUMENTS

| | | | |
|---|---|---|---|
| 8,098,635 B2 | 1/2012 | Montojo et al. | |
| 8,099,047 B2 | 1/2012 | David et al. | |
| 8,112,650 B2 | 2/2012 | Qing et al. | |
| 8,233,462 B2 | 7/2012 | Walton et al. | |
| 2002/0045435 A1 | 4/2002 | Fantaske | |
| 2002/0164963 A1 | 11/2002 | Tehrani et al. | |
| 2005/0135284 A1 | 6/2005 | Nanda et al. | |
| 2005/0136914 A1 | 6/2005 | Van Kampen et al. | |
| 2005/0152324 A1 | 7/2005 | Benveniste | |
| 2005/0286454 A1 | 12/2005 | Morimoto et al. | |
| 2006/0029024 A1 | 2/2006 | Zeng et al. | |
| 2007/0077936 A1 | 4/2007 | Tomisawa et al. | |
| 2007/0171910 A1 | 7/2007 | Kumar | |
| 2008/0069021 A1* | 3/2008 | Chhabra | 370/311 |
| 2009/0016248 A1 | 1/2009 | Li et al. | |
| 2009/0073945 A1 | 3/2009 | Seok | |
| 2009/0097438 A1 | 4/2009 | Kneckt et al. | |
| 2009/0196211 A1 | 8/2009 | Wentink | |
| 2009/0310578 A1 | 12/2009 | Convertino et al. | |
| 2010/0070767 A1 | 3/2010 | Walker et al. | |
| 2010/0118797 A1 | 5/2010 | Park | |
| 2010/0128701 A1 | 5/2010 | Nagaraja | |
| 2010/0153727 A1 | 6/2010 | Reznik et al. | |
| 2010/0189021 A1 | 7/2010 | He et al. | |
| 2010/0254290 A1* | 10/2010 | Gong et al. | 370/311 |
| 2010/0284316 A1 | 11/2010 | Sampathkumar | |
| 2010/0325459 A1 | 12/2010 | Kangude et al. | |
| 2011/0051638 A1* | 3/2011 | Jeon et al. | 370/311 |
| 2011/0086662 A1 | 4/2011 | Fong et al. | |
| 2011/0158142 A1 | 6/2011 | Gong et al. | |
| 2011/0237294 A1 | 9/2011 | Hussain | |
| 2011/0280170 A1 | 11/2011 | Bowser et al. | |
| 2012/0021735 A1 | 1/2012 | Maeder et al. | |
| 2012/0151089 A1 | 6/2012 | Ponmudi et al. | |
| 2013/0028206 A1 | 1/2013 | Cho et al. | |

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications", *IEEE Std 802.11-2007 (Revision of IEEE.Std 802.11-1999)* Section 5; http://standards.ieee.org/getieee802/download/802.11-2007.pdf. (Date Obtained from Internet Apr. 6, 2010) Jun. 12, 2007, pp. 72-99.

Jung, Eun-Sun et al., "A Power Control MAC Protocol for Ad Hoc Networks", 2002, 12 pages.
U.S. Appl. No. 12/727,610, filed Mar. 19, 2010, Sathyamurthy, Dhanasekaran et al.
"US Appl. No. 12/562,819 Office Action", Feb. 5, 2013, 29 pages.
"US Appl. No. 12/727,610 Final Office Action", Jan. 7, 2013, 24 pages.
"US Appl. No. 12/768,912 Final Office Action", Feb. 22, 2013, 27 pages.
Co-pending U.S. Appl. No. 12/562,819, filed Sep. 18, 2009.
Co-pending U.S. Appl. No. 12/768,434, filed Apr. 27, 2010.
Co-pending U.S. Appl. No. 12/768,912, filed Apr. 28, 2010.
Co-pending U.S. Appl. No. 13/088,081, filed Apr. 15, 2011.
Co-pending U.S. Appl. No. 12/963,160, filed Mar. 6, 2012.
Co-pending U.S. Appl. No. 13/413,011, filed Mar. 6, 2012.
IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) http://standards.ieee.org/getieee802/download/802.11-2007.pdf.
(Date Obtained from Internet Oct. 21, 2009) Jun. 12, 2007, pp. 59-312.
"IEEE Std 802.11z: IEEE Standard for Information Technology— Amendment 7: Extensions to Direct-Link Setup", IEEE Computer Society 3 Park Avenue New York, NY 10016-5997 http://ieeexplore.ieee.org/xpl/freeabs alljsp"amumber=5605400 Oct. 14, 2010, 96 pages.
"U.S. Appl. No. 12/492,405 Office Action", Mar. 15, 2012, 9 pages.
"U.S. Appl. No. 12/562,819 Office Action",Nov. 14, 2011, 26 pages.
"U.S. Appl. No. 12/562,819 Final Office Action", May 3, 2012, 32 pages.
"U.S. Appl. No. 12/727,610 Office Action", Aug. 2, 2012, 20 pages.
"U.S. App. No. 12/768,912 Office Action", Sep. 7, 2012, 23 pages.
"PCT Application No. PCT/US2011/062154 International Search Report", Mar. 6, 2012, 13 pages.
"U.S. Appl. No. 12/492,405 Office Action", Sep. 27, 2012, 10 pages.
"U.S. Appl. No. 12/768,434 Office Action", Oct. 15, 2012, 11 pages.
"PCT Application No. PCT/US11/62154 International Preliminary Report on Patentability", Jun. 20, 2013, 8 pages.
"PCT Application No. PCT/US2013/029377 International Search Report", Jun. 17, 2013, 11 pages.
"U.S. Appl. No. 12/963,160 Office Action", Apr. 16, 2013, 25 pages.
"U.S. Appl. No. 13/088,081 Non-Final Office Action", Apr. 24, 2013, 14 Pages.

* cited by examiner

DYNAMIC POWER MODE SWITCH IN A WIRELESS AD-HOC SYSTEM

BACKGROUND

Embodiments of the inventive subject matter generally relate to the field of wireless communications and, more particularly, to a dynamic power mode switch technique in a wireless ad-hoc network.

Wireless devices implement power saving mechanisms to conserve battery power and reduce energy consumption. In an ad-hoc wireless local area network (WLAN), a wireless device generates unicast and/or multicast announcement traffic indication map (ATIM) frames to notify other wireless devices of pending data transfers. The ATIM frames are transmitted in an ATIM window. The wireless devices that receive the ATIM frames remain in an active state to receive the data. The wireless devices that do not receive the ATIM frames enter into a sleep mode or an inactive state after the ATIM window ends.

SUMMARY

Various embodiments for a dynamic power mode switch technique in an ad-hoc wireless network are disclosed. In one embodiment, it is determined that a current power mode in a first of a plurality of wireless network devices in the ad-hoc wireless network should be changed. A power mode switch request is transmitted to one or more additional wireless network devices of the plurality of wireless network devices in the ad-hoc wireless network in response to determining that the current power mode in the first of the plurality of wireless network devices in the ad-hoc wireless network should be changed. It is determined whether to transmit to the one or more additional wireless network devices a notification in a beacon frame to change the current power mode based, at least in part, on one or more responses to the power mode switch request received from the one or more additional wireless network devices. A first predefined value is transmitted in the beacon frame to the one or more additional wireless network devices to change the current power mode of the one or more additional wireless network devices, in response to determining that the notification to change the current power mode should be transmitted. A second predefined value is transmitted in the beacon frame to the one or more additional wireless network devices to maintain the current power mode of the one or more additional wireless network devices, in response to determining that the notification to change the current power mode should not be transmitted.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
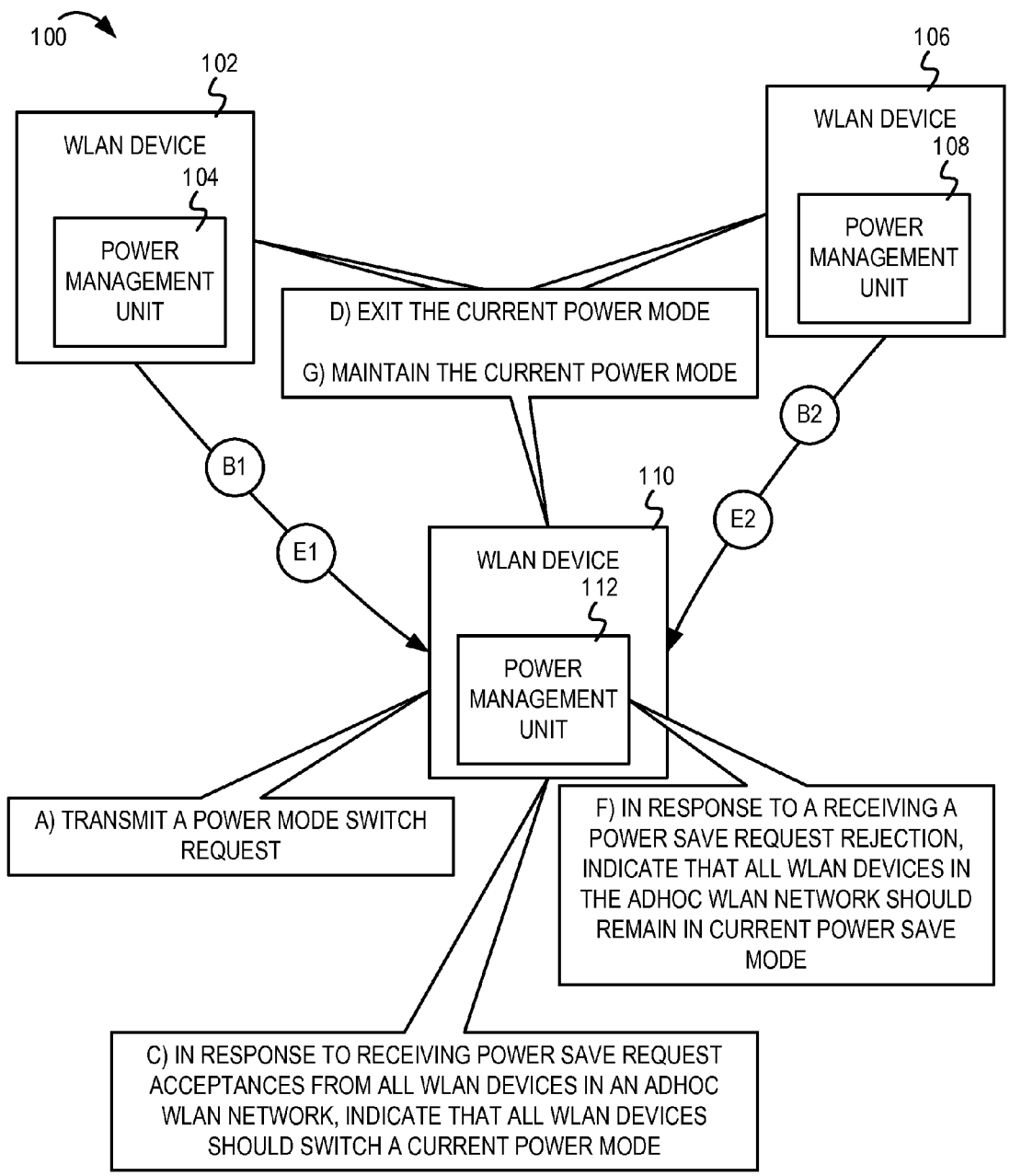
FIG. 1 is an example conceptual diagram illustrating a dynamic power mode switching mechanism.

The description that follows includes exemplary systems, methods, techniques, instruction sequences, and computer program products that embody techniques of the present inventive subject matter. However, it is understood that the described embodiments may be practiced without these specific details. For instance, although examples refer to a dynamic power mode switching mechanism for wireless local area network (WLAN) devices, the dynamic power mode switching mechanism can be implemented by other standards and devices, e.g., Bluetooth®, WiMAX, ZigBee®, Wireless USB devices, etc. In other instances, well-known instruction instances, protocols, structures, and techniques have not been shown in detail in order not to obfuscate the description.

In an ad-hoc wireless 802.11 network, an ATIM frame serves as an indication of a pending data transfer. A WLAN device in the ad-hoc wireless 802.11 network typically implements an ad-hoc power save mode, whereby the WLAN device enters an inactive state if the WLAN device does not receive the ATIM frame during a pre-determined time interval (e.g., an ATIM window in a beacon interval). In continuous traffic environments and high traffic environments, the WLAN device in the ad-hoc wireless 802.11 network may not enter the inactive state. Thus, the ad-hoc power save mode may not be very effective and may result in low throughput and poor performance of the WLAN device. Moreover, the ad-hoc power save mode does not allow the WLAN device to switch from a power save enabled mode to a power save disabled mode in the continuous traffic environment. This can result in the WLAN device switching between an active state and the inactive state too frequently, resulting in poor power saving and poor performance.

Data throughput and data transfer reliability can be improved in the WLAN device by implementing a mechanism to dynamically switch to a power mode that is conducive to the ad-hoc wireless 802.11 network environment. Functionality can be implemented to enable or disable the ad-hoc power save mode depending on whether or not WLAN devices are in a continuous traffic environment. In some embodiments, an initiating WLAN device can initiate a power mode switch by transmitting a power mode switch request in a multicast ATIM frame and a beacon frame. Other WLAN devices in the ad-hoc wireless 802.11 network can similarly transmit beacon frames to indicate acceptance or rejection of the power mode switch request. The initiating WLAN device can indicate success or failure of the power mode switch request based on responses to the power mode switch request. Accordingly, the WLAN devices in the ad-hoc wireless 802.11 network may (e.g., for a successful power mode switch request) or may not (e.g., for a failed power mode switch request) enable/disable the ad-hoc power save mode. This allows a smooth transition to an appropriate power mode depending on the environment (e.g., a high traffic environment). Disabling the ad-hoc power save mode in the continuous traffic environment also improves data throughput and reliability.

FIG. 1 is an example conceptual diagram illustrating a dynamic power mode switching mechanism. FIG. 1 depicts an ad-hoc wireless 802.11 network ("ad-hoc WLAN) 100 comprising a WLAN device 102, a WLAN device 106, and a WLAN device 110. Each of the WLAN devices 102, 106, and 110 respectively comprises power management units 104, 108, and 112. The power management units 104, 108, and 112 implement functionality to request a switch from a current power mode ("power mode switch request"), and accept/reject power mode switch requests from other devices.

At stage A, the power management unit 112 in the WLAN device 110 ("initiating WLAN device") transmits a power mode switch request. At stage A, in some embodiments, the power management unit 112 sets a power management (PM) flag in a multicast ATIM frame and transmits the multicast ATM frame to the other WLAN devices 102 and 106 in the ad-hoc WLAN 100. In one implementation, the PM flag indicates a power management state of the WLAN device. Setting the PM flag (e.g., PM=1) can indicate that the WLAN device is in an active state. Additionally, the power management unit 112 also sets a power management acceptance (PMA) field in a beacon frame. In one embodiment, the PMA field may be part of IBSS parameters in a frame control sequence (FCS) field of the beacon frame. In one example, the power management unit 112 sets the PMA flag to a predefined value (e.g., 0x80) to indicate the power mode switch request within the beacon frame. The initiating WLAN device 110 then transmits the beacon frame to all listening WLAN devices 102 and 106 to indicate the power mode switch request. In some implementations, the power management unit 112 may transmit the power mode switch request in response to determining that the ad-hoc WLAN 100 is in a continuous traffic or a high traffic environment. In a continuous traffic or high traffic environment, the power management unit 112 may transmit the power mode switch request to disable ad-hoc power save mode. Transmitting the power mode switch request in the beacon frame can help ensure that all WLAN devices in the ad-hoc WLAN 100 receive the power mode switch request. Transmitting the power mode switch request in the beacon frame can also help ensure that WLAN devices currently not in the ad-hoc WLAN 100, but that intend to join the ad-hoc WLAN 100, can receive the power mode switch request.

At stage B1, the power management unit 104 in the WLAN device 102 indicates acceptance of the power mode switch request. The power management unit 104 may accept the power mode switch request on determining that the WLAN device 102 will continuously transmit data to or receive data from other WLAN devices. For example, the power management unit 104 may accept the power mode switch request to disable the ad-hoc power save mode and to maximize throughput in the high traffic environment. The power management unit 104 can set a PMA field in a beacon frame of the WLAN device 102 to indicate acceptance of the power mode switch request. In one implementation, the power management unit 104 may set the PMA field to a predefined value (e.g., 0x01) to indicate the acceptance of the power mode switch request. By indicating the acceptance of the power mode switch request, the power management unit 104 indicates that the WLAN device 102 will switch its current power mode.

At stage B2, the power management unit 108 in the WLAN device 106 indicates acceptance of the power mode switch request. As described above, the power management unit 108 may accept the power mode switch request to maximize throughput in the high traffic environment. The power management unit 108 can set a PMA field in a beacon frame of the WLAN device 106 to indicate the acceptance of the power mode switch request. In one implementation, the power management unit 108 may set the PMA field to a predefined value (e.g., 0x01) to indicate acceptance of the power mode switch request.

At stage C, the power management unit 112 in the initiating WLAN device 110 indicates that all the WLAN devices in the ad-hoc WLAN 100 should switch from a current power mode ("successful power mode reset"). The power management unit 112 may indicate that the WLAN devices 102, 106, and 110 should switch from the current power mode in response to receiving an acceptance of the power mode switch request from all WLAN devices in the ad-hoc WLAN 100. The power management unit 112 may set the PMA field in a beacon frame transmitted by the WLAN device 110 to indicate that that all the WLAN devices in the ad-hoc WLAN 100 should switch from the current power mode. For example, the power management unit 112 may set the PMA field to a predefined value (e.g., 0x00) to indicate the successful power mode reset. The initiating WLAN device 110 then transmits the beacon frame to all the listening WLAN devices.

At stage D, the power management units 104, 108, and 112 cause the WLAN devices 102, 106, and a 110, respectively, to exit the current power mode. For example, the power management units 104, 108, and 112 cause the respective WLAN devices 102, 106, and 110 to exit the ad-hoc power save mode and to disable the ad-hoc power save mode. Exiting the ad-hoc power save mode ensures that the WLAN devices 102, 106, and 110 in the ad-hoc WLAN 100 do not enter the sleep mode during periods of continuous traffic. In other words, exiting the ad-hoc power save mode ensures that the WLAN devices 102, 106, and 110 are always in an active state to receive/transmit data to other WLAN devices in the ad-hoc network.

Stages E1, E2, F, and G illustrate a separate scenario where at least one WLAN device in the ad-hoc WLAN 100 does not respond to or rejects the power mode switch request (transmitted at stage A).

At stage E1, the power management unit 104 in the WLAN device 102 indicates acceptance of the power mode switch request. As described above, the power management unit 104 can set a PMA field in a beacon frame of the WLAN device 102 to indicate the acceptance of the power mode switch request.

At stage E2, the power management unit 108 in the WLAN device 106 indicates rejection of the power mode switch request. In one example, the power management unit 108 may reject the power mode switch request (to disable the ad-hoc power save mode) on determining that the WLAN device 106 will not transmit data to or receive data from other WLAN devices in the ad-hoc WLAN 100. For example, the power management unit 108 may access a transmit data buffer, determine that the WLAN device 106 will not transmit data to another WLAN device, and determine that the WLAN device 106 will enter a sleep mode. The power management unit 108 can set a PMA field in a beacon frame of the WLAN device 106 to indicate rejection of the power mode switch request. In one implementation, the power management unit 108 may set the PMA field to a predefined value (e.g., 0x0F) to indicate the rejection of the power mode switch request. As another example, the power management unit 108 may not be configured to recognize and to interpret the PMA field, may not set the PMA field, and may therefore ignore the power mode switch request. As another example, the power management unit 108 may receive the power mode switch request and may choose to ignore (and therefore to reject) the power mode switch request by setting the PMA field to a predefined value (e.g., 0x00).

At stage F, the power management unit 112 in the initiating WLAN device 110 indicates that the WLAN devices in the ad-hoc WLAN 100 should remain in the current power mode ("failed power mode reset"). The power management unit 112 may indicate that the WLAN devices 102, 106, and 110 should not switch from the current power mode in response to receiving the rejection of the power mode switch request from any one of the listening WLAN devices, e.g., the WLAN device 106. The power management unit 112 may set a PMA field in a beacon frame to indicate that that all the WLAN devices in the ad-hoc WLAN 100 should remain in the current power mode. For example, the power management unit 112 may set the PMA field to a predefined value (e.g., 0xFF) to indicate the failed power mode reset. The initiating WLAN device 110 then transmits the beacon frame to all the listening WLAN devices.

At stage G, the power management units 104, 108, and 112 maintain the current power mode in the respective WLAN devices 102, 106, and 110. For example, the power management units 104, 108, and 112 may maintain the ad-hoc power save mode in their respective WLAN devices 102, 106, and 110. The WLAN devices 102, 106, and 110 continue to operate in the ad-hoc power save mode, whereby the receiving WLAN device enters the sleep mode, if the receiving WLAN device does not receive either the unicast or the multicast ATIM frame during the ATIM window.

Figure 2:
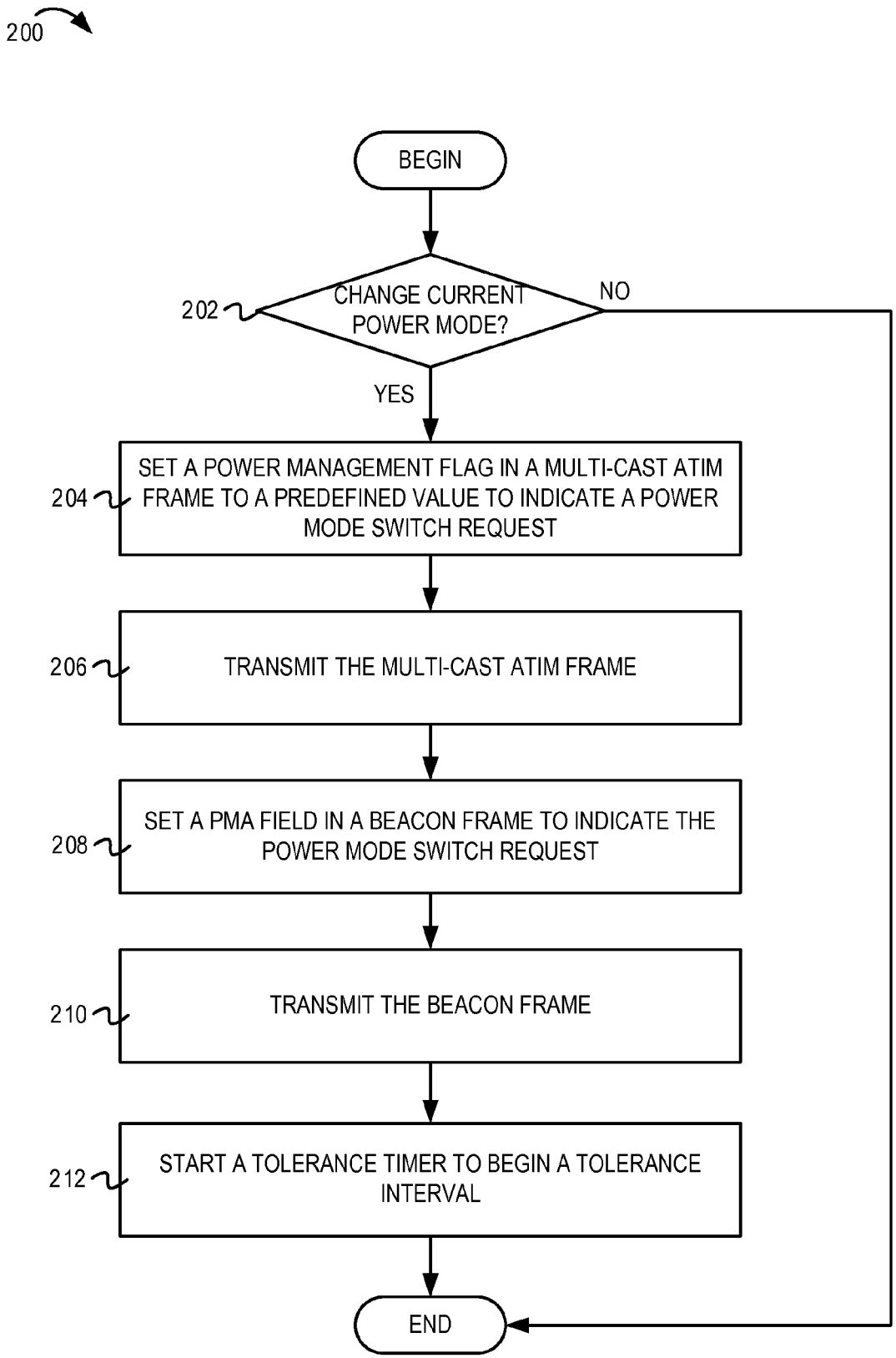
FIG. 2 is a flow diagram illustrating example operations for transmitting a power mode switch request.

FIG. 2 is a flow diagram illustrating example operations for transmitting a power mode switch request. Flow 200 begins at block 202.

At block 202, it is determined whether a current power mode should be changed. For example, the power management unit 112 of an initiating WLAN device 110 (shown in FIG. 1) may determine whether the current power mode should be changed. For example, the current power mode may be an ad-hoc power save mode, whereby the WLAN device 110 enters a sleep mode if the WLAN device 110 does not receive an ATIM frame during an ATIM window in a beacon interval. The power management unit 112 may determine that the WLAN device 110 should disable the ad-hoc power save mode in response to determining that the WLAN device 110 is in a high traffic/continuous traffic network. If the power management unit 112 determines that the current power mode should be changed, the flow continues at block 204. Otherwise, the flow ends.

At block 204, a power management (PM) flag in a multicast ATIM frame is set to a predefined value to indicate a power mode switch request. For example, the power management unit 112 sets the PM flag to 0x01 in the multicast ATIM frame. The multicast ATIM frame is typically transmitted to notify peer WLAN devices in an ad-hoc WLAN of pending data transfers. The PM flag is a part of a frame control sequence (FCS) field in the ATIM frame. Setting the PM flag to 0x01 can indicate that receiving WLAN devices should not enter the sleep mode because of the pending data transfers. Setting the PM flag to 0x01 can also indicate a power mode switch request. In one implementation, setting the PM flag to 0x01 can indicate a request to switch the current power mode. For example, if the ad-hoc power save mode is enabled, setting the PM flag to 0x01 can be an indication to disable the ad-hoc power save mode. As another example, if the ad-hoc power save mode is disabled, setting the PM flag to 0x01 can be an indication to enable the ad-hoc power save mode. The flow continues at block 206.

At block 206, the multicast frame ATIM frame is transmitted. For example, the WLAN device 110 transmits the multicast ATIM frame to WLAN devices 102 and 106 in the ad-hoc WLAN 100. All the WLAN devices in the ad-hoc WLAN 100 receive the multicast ATIM frame, read the PM flag in the multicast ATIM frame, and accordingly determine whether to enable or disable the current power mode, as will be further described below with reference to FIG. 3. The flow continues at block 208.

At block 208, a power management acceptance (PMA) field in a beacon frame is set to a predefined value to indicate a power mode switch request. For example, the power management unit 112 of the initiating WLAN device 110 sets the PMA field in the beacon frame to 0x80. The PMA field in the beacon frame serves as an alternate power mode switch request (in addition to the PM flag in the ATIM frame). The PMA field enables WLAN devices that did not receive the ATIM frame to receive the power mode switch request in the beacon frame. In one example, the PMA field may be part of a frame control sequence (FCS) field in the beacon frame. The FCS field in the beacon frame comprises optional fields for independent basic service set (IBSS) parameters to indicate parameters (e.g., length of an ATIM window) of the ad-hoc WLAN 100. In one example, the default value of the PMA field may be 0x00. The value of the PMA field may be changed to indicate a power mode switch request, or to respond to a power mode switch request received from another device. In one implementation, the PMA field can be an unsigned character data field. In another implementation, the PMA field can be an integer data field or other suitable data field. In one implementation, the power management unit 112 can set the PMA field to 0x80 to indicate the power mode switch request. In another implementation, the power management unit 112 can set the PMA field to another suitable predefined value that indicates a pending power mode switch request. The flow continues at block 210.

At block 210, the beacon frame is transmitted. For example, the WLAN device 110 transmits the beacon frame. Transmitting the power mode switch request in the beacon frame can ensure that all the WLAN devices in the ad-hoc WLAN 100 and all WLAN devices in the vicinity of the initiating WLAN device 110 receive the power mode switch request. The flow continues at block 212.

At block 212, a tolerance timer is started to begin a tolerance interval. For example, the power management unit 112 starts the tolerance timer to begin the tolerance interval. The tolerance interval indicates a maximum time interval that the power management unit 112 will wait to receive a response to the power mode switch request. In one embodiment, the tolerance interval is dependent on a number of WLAN devices in the ad-hoc WLAN 100 and a beacon interval of the WLAN devices. For example, the tolerance interval can be set as a product of the number of WLAN devices in the ad-hoc WLAN and the beacon interval. The tolerance interval can help ensure that all the WLAN devices in the ad-hoc WLAN have an opportunity to gain control of a communication medium (e.g., a WLAN communication channel) to transmit the response to the power mode switch request. From block 212, the flow ends.

It should be noted that, although FIG. 2 depicts the power management unit 112 of the initiating WLAN device 110 starting the tolerance interval after the beacon frame is transmitted, in some implementations the power management unit 112 may start the tolerance interval after the multicast ATIM frame is transmitted. The initiating WLAN device 110 may continue normal operations (e.g., transmitting data, receiving data, transmitting beacon frames, etc.) while waiting for responses to the power mode switch request. The initiating WLAN device 110 may also listen for beacon frames from other WLAN devices in the ad-hoc WLAN 100 and for indications of acceptance/rejection of the power mode switch request. The initiating WLAN device 110 may continue to transmit beacon frames with the PMA field set to 0x80 and multicast ATIM frames with the PM flag set to 0x01 until the tolerance interval expires. The initiating WLAN device 110 may change the value of the PMA field in the beacon frame to indicate a successful power mode reset or a failed power mode reset after the tolerance interval expires, as will be further described below with reference to FIG. 4.

Figure 3:
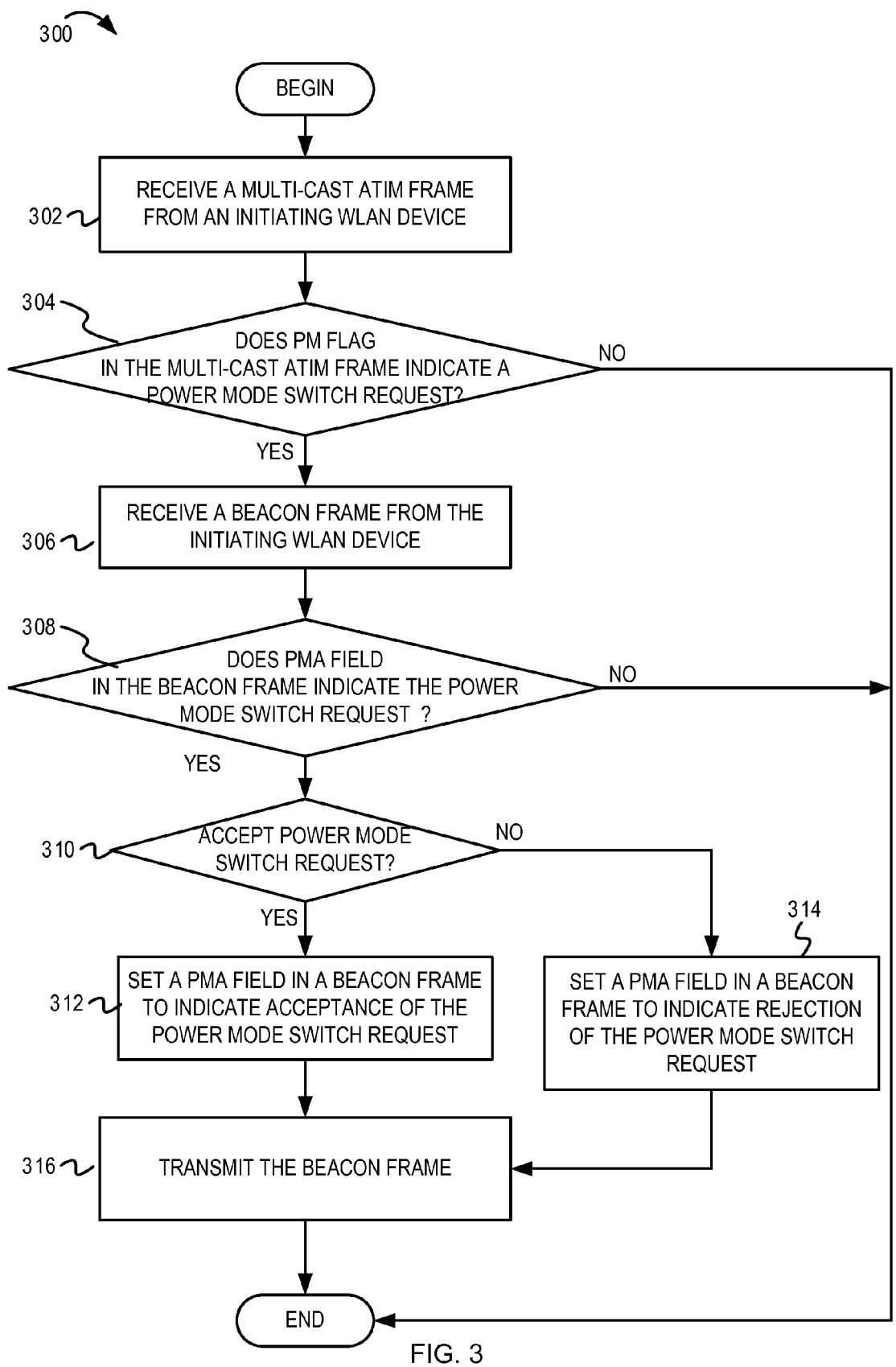
FIG. 3 is a flow diagram illustrating example operations of a WLAN device for transmitting a response to a power mode switch request.

FIG. 3 is a flow diagram illustrating example operations of a WLAN device for transmitting a response to a power mode switch request. Flow 300 begins at block 302.

At block 302, a receiving WLAN device receives a multicast ATIM frame from an initiating WLAN device. For example, the receiving WLAN device 102 shown in FIG. 1 receives the multicast ATIM frame from the initiating WLAN device 110. In some embodiments, all the WLAN devices in the ad-hoc WLAN are synchronized with a common timestamp. This can help ensure that the WLAN devices in the ad-hoc WLAN are in an active state during beacon generation (e.g., during a beacon interval) and are in the active state to receive beacon frames from other WLAN devices in the ad-hoc WLAN. The flow continues at block 304.

At block 304, it is determined whether a power management (PM) flag in the multicast ATIM frame is set to a predefined value that indicates power mode switch request. For example, the power management unit 104 in the receiving WLAN device 102 determines whether the PM flag in the multicast ATIM frame is set to 0x01. The PM flag being set to 0x01 can indicate a request from the initiating WLAN device 110 to change or swap a current power mode. For example, on receiving the multicast ATIM frame with the PM flag set to 0x01, the power management unit 104 can determine whether the WLAN device 102 should enable/disable an ad-hoc power save mode. If the power management unit 104 determines that the power management flag in the multicast ATIM frame is set to the predefined value that indicates the power mode switch request, the flow continues at block 306. Otherwise, the flow ends.

At block 306, a beacon frame is received from the initiating WLAN device. For example, the receiving WLAN device 102 receives the beacon frame from the initiating WLAN device 110. The flow continues at block 308.

At block 308, it is determined whether a PMA field in the received beacon frame is set to a predefined value that indicates the power mode switch request. For example, the power management unit 104 in the receiving WLAN device 102 determines whether the PMA field in the received beacon frame is set to 0x80. The PMA field in the received beacon frame being set to 0x80 indicates the power mode switch request. For example, the PMA field in the received beacon frame being set to 0x80 indicates a request that all WLAN devices in the ad-hoc WLAN 100 should disable the ad-hoc power save mode. If the power management unit 104 determines that the PMA field in the received beacon frame is set to the predefined value that indicates the power mode switch request, the flow continues at block 310. Otherwise, the flow ends.

At block 310, it is determined whether the power mode switch request should be accepted. For example, the power management unit 104 in the receiving WLAN device 102 determines whether the power mode switch request should be accepted. For example, the power management unit 104 may determine that the power mode switch request should be rejected based on determining that the WLAN device 102 is not configured to disable the ad-hoc power save mode. If it is determined that the power mode switch request should be accepted, the flow continues at block 314. Otherwise, the flow continues at block 312.

At block 312 a PMA field in a beacon frame is set to a predefined value to indicate acceptance of the power mode switch request. For example, the receiving WLAN device 102 creates the beacon frame. The power management unit 104 in the receiving WLAN device 102 sets the PMA field in the beacon frame to 0x01 to indicate the acceptance of the power mode switch request. In other words, the power management unit 104 indicates to the initiating WLAN device 110 that the receiving WLAN device 102 will change the current power mode if all other WLAN devices in the ad-hoc WLAN 100 accept the power mode switch request. The flow continues at block 316.

At block 314 the PMA field in the beacon frame is set to a predefined value to indicate rejection of the power mode switch request. The flow 300 moves from block 310 to block 314 if the power management unit 104 determines that the power mode switch request should be rejected. For example, the receiving WLAN device 102 creates the beacon frame. The power management unit 104 in the receiving WLAN device 102 sets the PMA field in the beacon frame to 0x0F to indicate rejection of the power mode switch request. In other words, the power management unit 104 indicates to the initiating WLAN device 110 that the receiving WLAN device 102 will not change the current power mode. The flow continues at block 316.

At block 316, the beacon frame is transmitted. For example, the receiving WLAN device 102 transmits the beacon frame. The initiating WLAN device 110 receives the beacon frame and reads the PMA field to determine the receiving WLAN device's response to the power mode switch request. The initiating WLAN device 110 accordingly determines whether a successful or a failed power mode reset notification should be issued, as will be described with reference to FIG. 4. From block 316, the flow ends.

Figure 4:
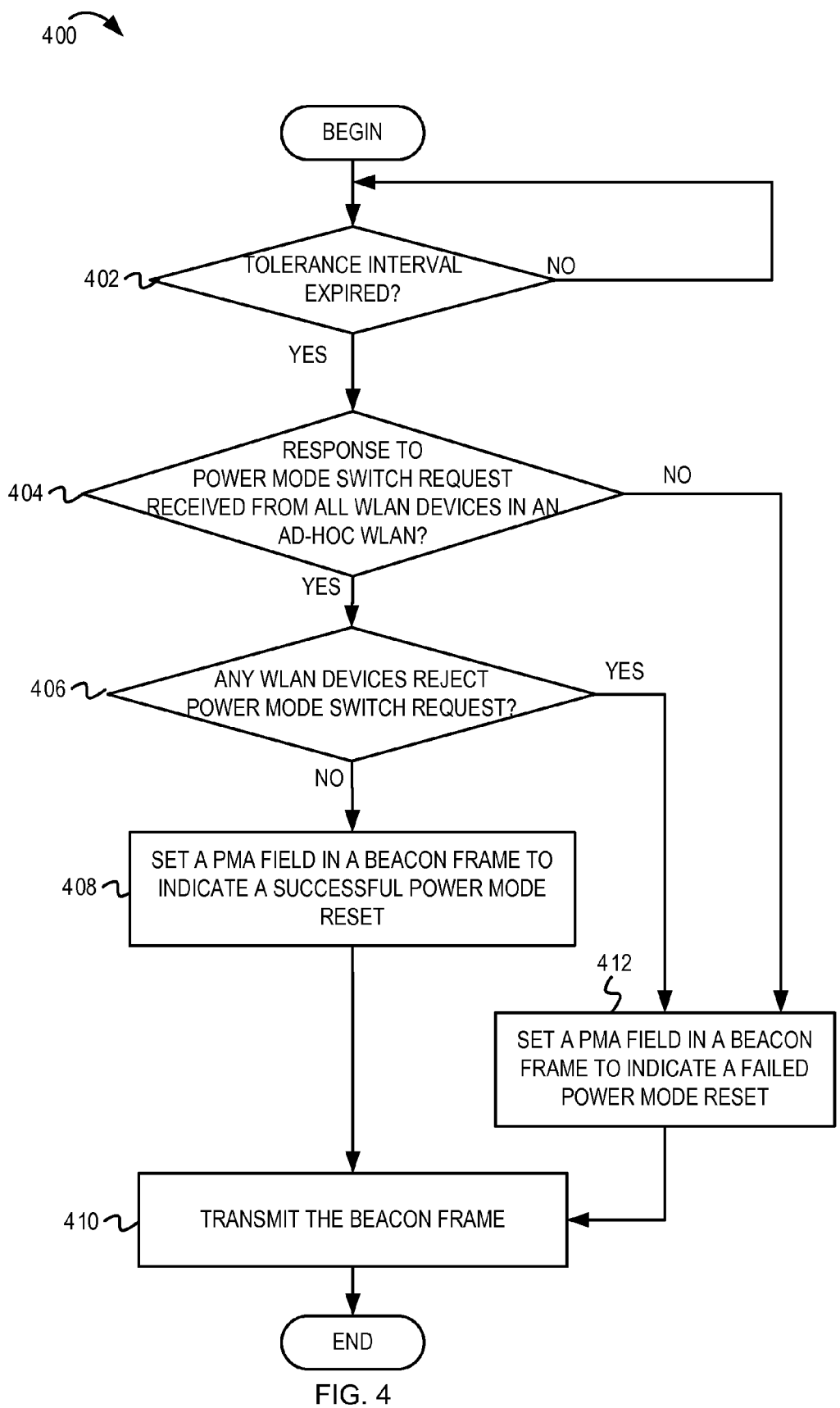
FIG. 4 is a flow diagram illustrating example operations for analyzing responses to a power mode switch request.

FIG. 4 is a flow diagram illustrating example operations for analyzing responses to a power mode switch request. Flow 400 begins at block 402.

At block 402, it is determined whether a tolerance interval has expired. For example, a power management unit 112 of the initiating WLAN device 110 determines whether the tolerance interval has expired. In one implementation, the power management unit 112 may begin the tolerance interval after transmitting a beacon frame with the power mode switch request. In another implementation, the power management unit 112 may begin the tolerance interval after transmitting a multicast ATIM frame with the power mode switch request. If the power management unit 112 determines that the tolerance interval has expired, the flow continues at block 404. If the power management unit 112 determines that the tolerance interval has expired, the power management unit 112 may also change a PMA field in subsequent beacon frames to indicate a successful/failed power mode reset (as described below). Otherwise, the flow loops back to block 402, where the power management unit 112 listens for beacon frames from other WLAN devices in an ad-hoc WLAN 100 and determines whether the tolerance interval has expired.

At block 404, it is determined whether a response to the power mode switch request has been received from all WLAN devices in the ad-hoc WLAN. For example, the power management unit 112 of the initiating WLAN device 110 can determine whether the response to the power mode switch request has been received from all the WLAN devices in the ad-hoc WLAN, based on a number of WLAN devices in the ad-hoc WLAN and a number of beacon frames received. If it is determined that the response to the power mode switch request has been received from all the WLAN devices in the ad-hoc WLAN, the flow continues at block 406. Otherwise, the flow continues at block 412.

At block 406, it is determined whether any of the WLAN devices in the ad-hoc WLAN reject the power mode switch request. For example, the power management unit 112 of the initiating WLAN device 110 can determine whether any of the WLAN devices reject the power mode switch request. The power management unit 112 may analyze beacon frames received within the tolerance interval to determine whether at least one of the WLAN devices rejects or ignores the power mode switch request. For example, the power management unit 112 may read a PMA field in each of the received beacon frames to determine whether the value of the PMA field is set to either 0x0F (indicating a rejected power mode switch request) or a 0x00 (indicating an ignored power mode switch request). If it is determined that at least one of the WLAN devices reject the power mode switch request, the flow continues at block 412. Otherwise, the flow continues at block 408.

At block 408, a PMA field in a beacon frame is set to a predefined value to indicate a successful power mode reset. For example, the power management unit 112 of the initiating WLAN device 110 sets the PMA field in the beacon frame to 0x00 to indicates the successful power mode reset. Setting the PMA field to 0x00 also indicates that all other WLAN devices in the ad-hoc WLAN should change the current power mode beginning at a next beacon interval. For example, the power management unit 112 may set the PMA field to 0x00 to indicate that all WLAN devices in the ad-hoc WLAN should disable the ad-hoc power save mode beginning at the beacon interval. The flow continues at block 410.

At block 412, the PMA field in the beacon frame is set to a predefined value to indicate a failed power mode reset. The flow 400 moves from block 406 to block 412 if the power management unit 112 determines that at least one of the WLAN devices in the ad-hoc WLAN rejects/ignores the power mode switch request. The flow 400 also moves from block 404 to block 412 if the power management unit 112 determines that at least one of the WLAN devices in the ad-hoc WLAN has not transmitted a response to the power mode switch request within the tolerance interval. For example, the power management unit 112 of the initiating WLAN device 110 sets the PMA field in the beacon frame to 0xFF to indicate the failed power mode reset. Setting the PMA field to 0xFF instructs other WLAN devices in the ad-hoc WLAN to not change the current power mode. For example, setting the PMA field to 0xFF can instruct other WLAN devices in the ad-hoc WLAN to retain the current power mode and to ignore power mode switch requests. The flow continues at block 410.

At block 410, the beacon frame is transmitted. For example, the initiating WLAN device 110 transmits the beacon frame indicating the successful power mode reset or the failed power mode reset. From block 410, the flow ends.

Figure 5:
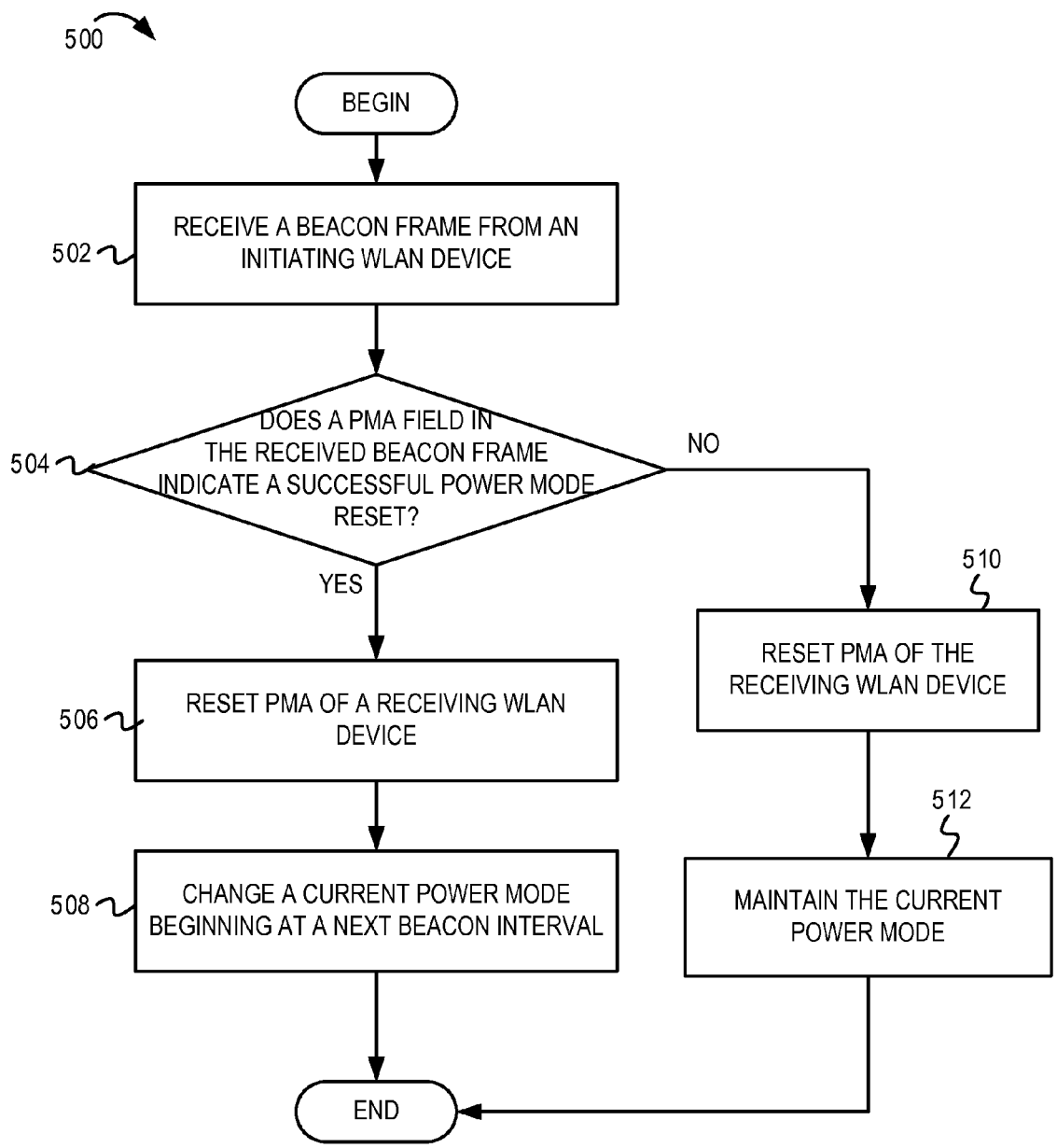
FIG. 5 is a flow diagram illustrating example operations in a receiving WLAN device for changing the power mode based on an indication from an initiating WLAN device.

FIG. 5 is a flow diagram illustrating example operations in a receiving WLAN device for changing the power mode based on an indication from an initiating WLAN device. Flow 500 begins at block 502.

At block 502, a receiving WLAN device receives a beacon frame ("received beacon frame") from an initiating WLAN device. For example, the receiving WLAN device 102 (shown in FIG. 1) receives the beacon frame from the initiating WLAN device 110. The flow continues at block 504.

At block 504, it is determined whether a PMA field in the received beacon frame is set to a predefined value indicating a successful power mode reset. For example, the power management unit 104 of the receiving WLAN device 102 determines whether the PMA field in the received beacon frame is set to 0x00. The PMA field being set to 0x00 indicates a successful power mode reset and indicates that the receiving WLAN device 102 should change a current power mode beginning at a next beacon interval. The PMA field being set to 0xFF indicates a failed power mode reset and indicates that the receiving WLAN device 102 should not change the current power mode. If the power management unit 104 determines that the PMA field in the received beacon frame is set to the predefined value that indicates the successful power mode reset, the flow continues at block 506. Otherwise, the flow continues at block 510.

At block 506, a PMA field in a subsequent beacon frame of the receiving WLAN device is reset. For example, the power management unit 104 in the receiving WLAN device 102 sets the PMA field in the subsequent beacon frame. Resetting the PMA field once a notification of the successful power mode reset is received can indicate that no power mode switch requests/responses are being transmitted. Resetting the PMA field once a notification of the successful power mode reset is received can also help avoid confusion between previously transmitted/received power mode switch requests/responses. The flow continues at block 508.

At block 508, a current power mode is changed beginning at the next beacon interval. In one implementation, the power management unit 104 of the receiving WLAN device 102 changes the current power mode in the WLAN device 102. For example, if an ad-hoc power save mode is enabled, on receiving an indication of the successful power mode reset, the power management unit 104 may disable the ad-hoc power save mode in the receiving WLAN device 102. As another example, if the ad-hoc power save mode is disabled, on receiving the indication of the successful power mode reset, the power management unit 104 may enable the ad-hoc power save mode in the receiving WLAN device 102. The power management unit 104 may cause processing units in the WLAN device 102 to change the current power mode. In one implementation, the power management unit 104 may, after each ATIM window, configure the processing units (e.g., by transmitting a message to appropriate processing units, etc.) to remain in an active state or to switch to an inactive state as required. For example, based on receiving the indication of the successful power mode reset, the power management unit 104 may determine that the ad-hoc power save mode should be disabled. Thus, after each ATIM window, the power management unit 104 may notify the processing units to remain in the active state. From block 508, the flow ends.

At block 510, the PMA field in the subsequent beacon frame of the receiving WLAN device is reset. The flow 500 moves from block 504 to block 510 on determining that the PMA field in the received beacon frame indicates a failed power mode reset. For example, the power management unit 104 in the receiving WLAN device 102 sets the PMA field in the subsequent beacon frame of the receiving WLAN device to 0x00 (e.g., to indicate that no power mode switch requests or responses are being transmitted, etc.). The flow continues at block 512.

At block 512, the current power mode is maintained. For example, the power management unit 104 in the receiving WLAN device 102 maintains the current power mode in the WLAN device 102. From block 512, the flow ends.

Figure 6:
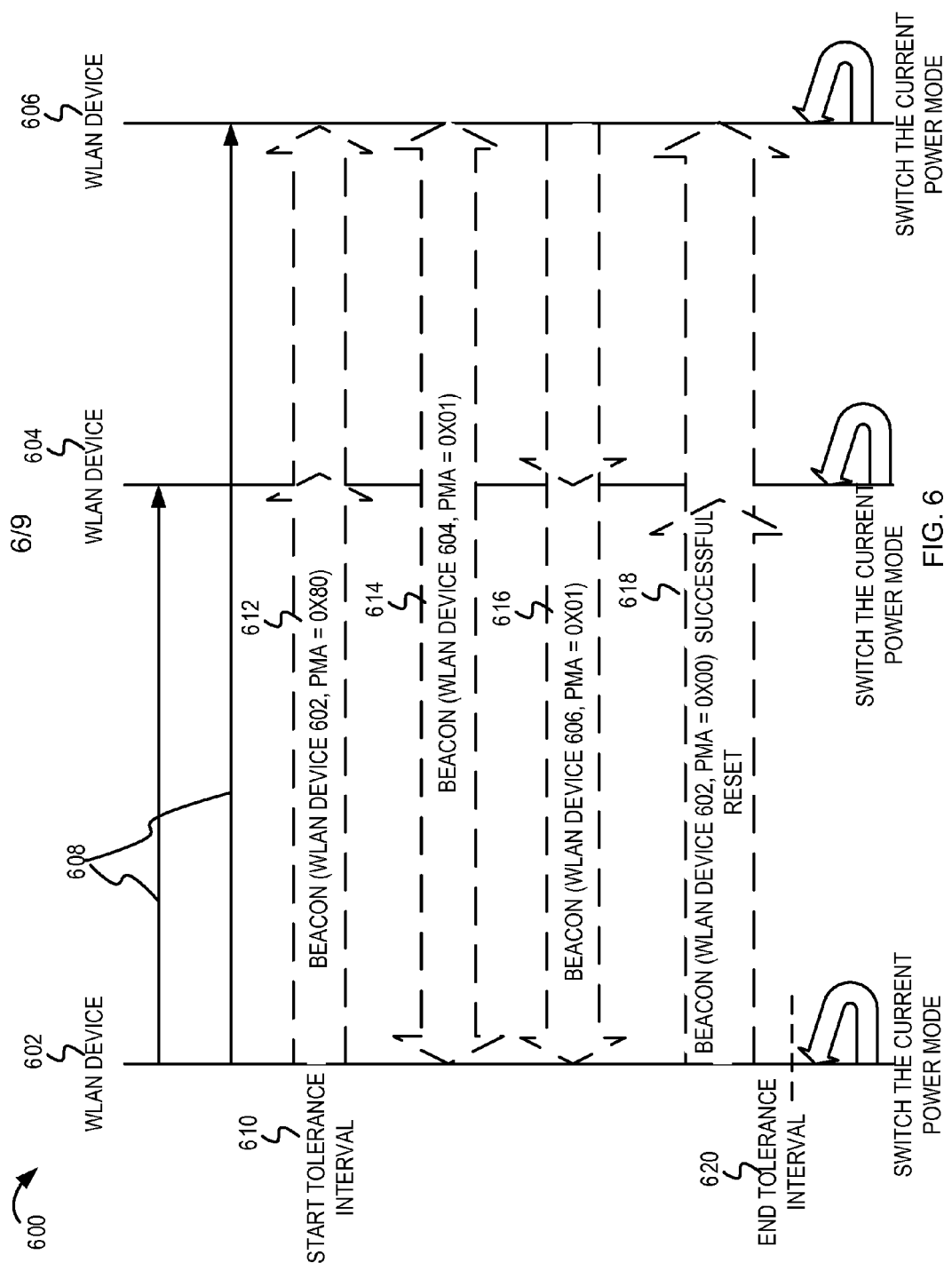
FIG. 6 depicts a sequence diagram illustrating responses to a power mode switch request for a successful power mode reset.

FIG. 6 depicts a sequence diagram illustrating responses to a power mode switch request for a successful power mode reset. FIG. 6 depicts three WLAN devices—WLAN device 602, WLAN device 604, and WLAN device 606. The WLAN device 602 transmits a multicast ATIM frame 608 with a power mode switch request to the WLAN devices 604 and 606. The WLAN device 602 then transmits a beacon frame 612 and sets a PMA field to 0x80 for the power mode switch request in the beacon frame. Additionally, the WLAN device 602 also starts the tolerance interval 610 as described with reference to flow 200 in FIG. 2. On receiving the beacon frame 612 from the WLAN device 602, the WLAN device 604 transmits a beacon frame 614 with a PMA field set to 0x01 to indicate acceptance of the power mode switch request. Likewise, on receiving the beacon frame 612 from the WLAN device 602, the WLAN device 606 transmits a beacon frame 616 with a PMA field set to 0x01 to indicate acceptance of the power mode switch request, as described with reference to flow 300 of FIG. 3. The WLAN device 602 receives the beacon frames 614 and 616 indicating acceptance of the power mode switch request before the tolerance interval expires at 620. The WLAN device 602 transmits a beacon frame 618 indicating a successful power mode reset to the WLAN devices 604 and 606. The WLAN devices 602, 604, and 606 switch their current power mode beginning at a next beacon interval.

Figure 7:
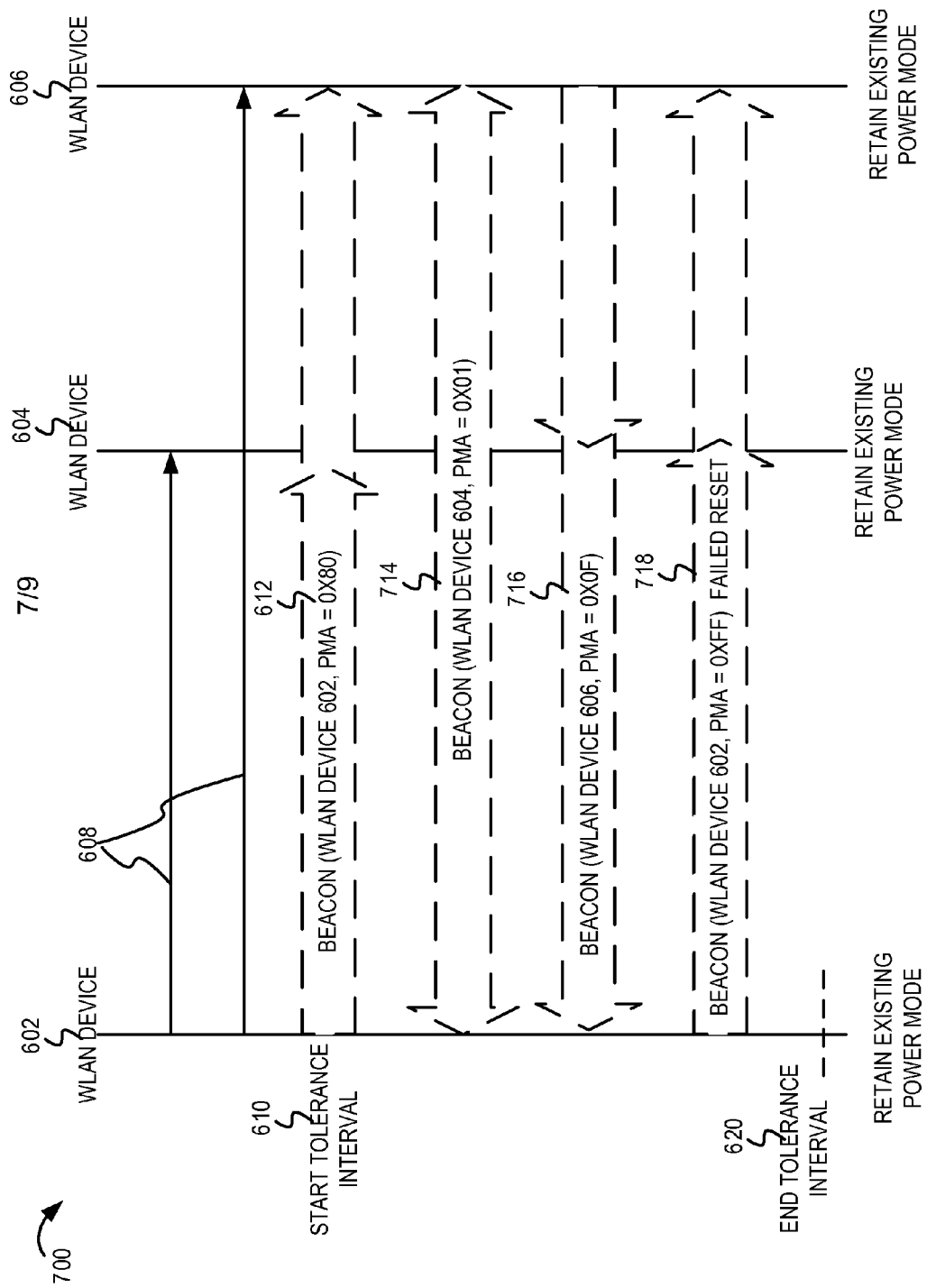
FIG. 7 depicts a sequence diagram illustrating one set of responses to the power mode switch request for a failed power mode reset.

FIG. 7 depicts a sequence diagram illustrating one set of responses to the power mode switch request for a failed power mode reset. As depicted in FIG. 7, in response to receiving the beacon frame 612 with the power mode switch request, the WLAN device 604 transmits a beacon frame 714 with a PMA field set to 0x00 to indicate acceptance of the power mode switch request. However, on receiving the beacon frame 612 from the WLAN device 602, the WLAN device 606 transmits a beacon frame 716 with a PMA field set to 0x0F to indicate rejection of the power mode switch request, as described with reference to flow 300 of FIG. 3. The WLAN device 602 receives the beacon frames 714 and 716 before the tolerance interval expires at 620. The WLAN device 602 analyses the beacon frames 714 and 716 and determines that the WLAN device 606 rejects the power mode switch request. The WLAN device 602 transmits a beacon frame 718 indicating a failed power mode reset to the WLAN devices 604 and 606. On receiving the beacon frame 718, the WLAN devices 602, 604, and 606 retain their existing power mode.

Figure 8:
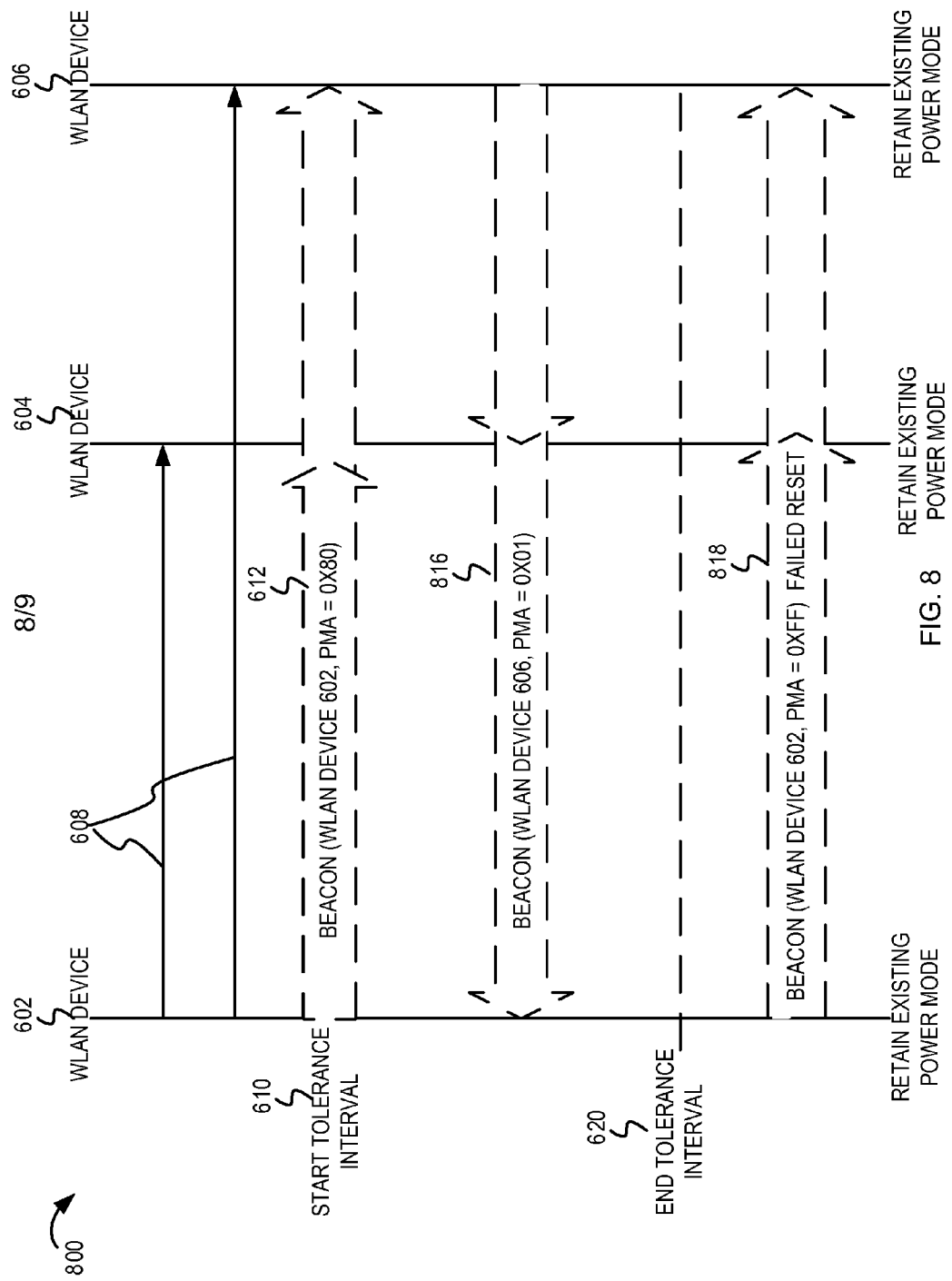
FIG. 8 depicts a sequence diagram illustrating a second set of responses to the power mode switch request for a failed power mode reset.

FIG. 8 depicts a sequence diagram illustrating a second set of responses to the power mode switch request for a failed power mode reset. As depicted in FIG. 8, in response to receiving the beacon frame 612 requesting the power mode switch, the WLAN device 606 transmits a beacon frame 816 with a PMA field set to 0x01 to indicate acceptance of the power mode switch request, as described with reference to flow 300 of FIG. 3. The WLAN device 602 receives the beacon frame 816 before the tolerance interval expires at 620. However, the WLAN device 602 does not receive a beacon frame from the WLAN device 604 indicating acceptance/rejection of the power mode switch request before the tolerance interval expires at 620. The WLAN device 602 considers this as a rejection of the power mode request by the WLAN device 604. The WLAN device 602 transmits a beacon frame 818 indicating a failed power mode reset to the WLAN devices 604 and 606. The WLAN devices 602, 604, and 606 retain their existing power mode.

It should be understood that the depicted diagrams (FIGS. 1-8) are examples meant to aid in understanding embodiments and should not be used to limit embodiments or limit scope of the claims. Embodiments may perform additional operations, fewer operations, operations in a different order, operations in parallel, and some operations differently. For instance, although FIG. 4 depicts the power management unit 112 of the initiating WLAN device 110 determining, after the tolerance interval expires, whether an indication of a successful or failed power mode reset should be transmitted to other WLAN devices in the ad-hoc WLAN, embodiments are not so limited. In some embodiments, the power management unit 112 may analyze the PMA field in each beacon frame as soon as the initiating WLAN device 110 receives the beacon frame from the receiving WLAN device (e.g., from the receiving WLAN device 102). The initiating WLAN device 110 may transmit the beacon frame indicating a failed power mode reset as soon as a beacon frame with a rejected power mode switch request (PMA field=0x0F) is received.

It should be noted that although FIG. 3 depicts the receiving WLAN device 102 receiving both the multicast ATIM frame and the beacon frame, embodiments are not so limited. In some embodiments, the receiving WLAN device 102 may receive either the multicast ATIM frame or the beacon frame. For example, the receiving WLAN device 102 that receives the multicast ATIM frame (but not the beacon frame) with the PM flag set to 0x01 may consider the PM flag set to 0x01 as the power mode switch request and may transmit a beacon frame to indicate acceptance/rejection of the power mode switch request. As another example, the receiving WLAN device 102 that receives the beacon frame (but not the multicast ATIM frame) with the PMA field set to 0x80 may transmit a beacon frame to indicate acceptance/rejection of the power mode switch request. In some implementations, the receiving WLAN device 102 may receive neither the multicast ATIM frame nor the beacon frame. In some implementation, the power management unit 102 in the receiving WLAN device 102 may not have be able to identify/read the PMA field. In these cases, the power management unit 102 may ignore the power mode switch request by transmitting a beacon frame with the PMA field set to 0x00.

Moreover, although FIG. 5 describes the receiving WLAN devices resetting the PMA field in their beacons frames, the initiating WLAN device 110 may also implement the operations of FIG. 5. On determining a successful power mode reset, the initiating WLAN device 110 may also change the current power mode from a next beacon interval. The power management unit 112 in the initiating WLAN device 110 may also reset the PM flag in the multicast ATIM frame. For example, the current power mode in the initiating WLAN device 110 may be the ad-hoc power save mode. In a first beacon interval, the power management unit 112 can transmit a beacon frame and reset the PMA field to 0x00 to indicate a successful power mode reset. The power management unit 112 can also reset the PM flag to 0x00 in the multicast ATIM frame and disable the ad-hoc power save mode at a start of a second beacon interval. Lastly, it should be noted that although FIGS. 1-8 refer to using beacon frames to request and to respond to a power mode switch, in other implementations, other frames (e.g., unicast ATIM frames, multicast ATIM frames, etc.) may be used to request and to respond to the power mode switch.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
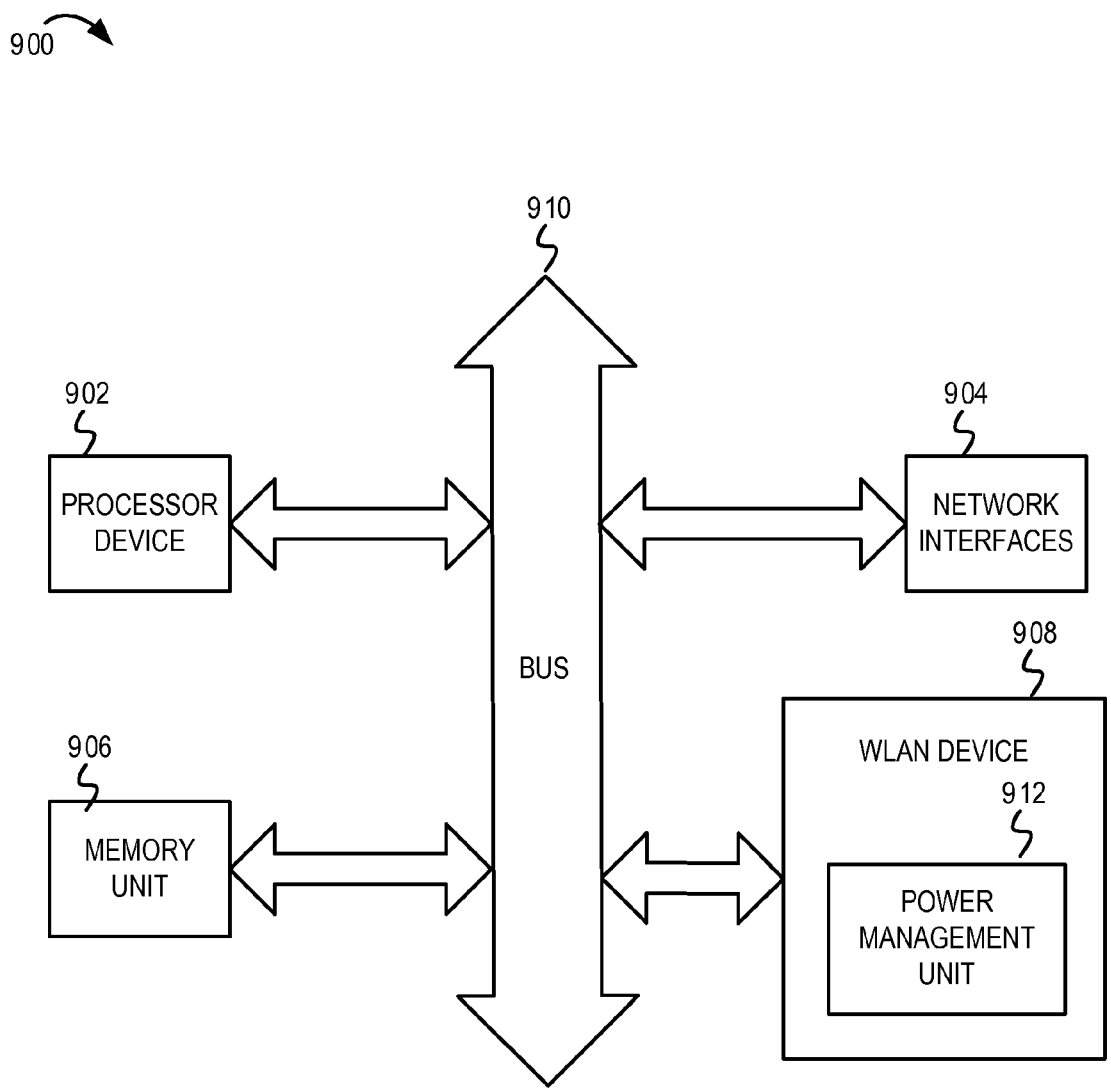
FIG. 9 is a block diagram of one embodiment of an electronic device including a mechanism for dynamic power mode switching.

FIG. 9 is a block diagram of one embodiment of an electronic device 900 including a mechanism for dynamically power mode switching. In some implementations, the electronic device 900 may be one of a personal computer (PC), a laptop, a netbook, a mobile phone, a personal digital assistant (PDA), or other electronic systems comprising a WLAN device. The electronic device 900 includes a processor device 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The user device 900 also includes a bus 910 (e.g., PCI, ISA, PCI-Express, HyperTransport®, InfiniBand®, NuBus, etc.), and network interfaces 904 that include at least one wireless network interface (e.g., a WLAN interface, a Bluetooth® interface, a WiMAX interface, a ZigBee® interface, a Wireless USB interface, etc.).

The electronic device 900 also includes a WLAN device 908. The WLAN device 908 comprises power management unit 912. The power management unit 912 implements functionality for transmitting a power mode switch request, transmitting responses (e.g., acceptances, rejections, etc.) to received power mode switch requests, and/or transmitting an indication of a successful/failed power mode reset based on receiving the responses from other WLAN devices in an ad-hoc WLAN, as described above with reference to FIGS. 1-8. It should be noted that any one of the above-described functionalities might be partially (or entirely) implemented in hardware and/or on the processing unit 902. For example, the functionality may be implemented with an application specific integrated circuit, in logic implemented in the processing unit 902, in a co-processor on a peripheral device or card, etc. Further, realizations may include fewer or additional components not illustrated in FIG. 9 (e.g., additional network interfaces, peripheral devices, etc.). The processor unit 902 and the network interfaces 904 are coupled to the bus 910. Although illustrated as being coupled to the bus 910, the memory 906 may be coupled to the processor unit 902.

While the embodiments are described with reference to various implementations and exploitations, it will be understood that these embodiments are illustrative and that the scope of the inventive subject matter is not limited to them. In general, techniques for dynamic power mode switch in an ad-hoc network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
  determining that a current power mode in a first of a plurality of wireless network devices in an ad-hoc wireless network should be changed;
  transmitting a power mode switch request to one or more additional wireless network devices of the plurality of wireless network devices in the ad-hoc wireless network in response to determining that the current power mode in the first of the plurality of wireless network devices in the ad-hoc wireless network should be changed;
  determining whether to transmit, to the one or more additional wireless network devices in the ad-hoc wireless network, a notification in a beacon frame to change the current power mode based, at least in part, on one or more responses to the power mode switch request received from the one or more additional wireless network devices;
  transmitting a first predefined value in the beacon frame to the one or more additional wireless network devices to change the current power mode of the one or more additional wireless network devices, in response to determining that the notification to change the current power mode should be transmitted; and transmitting a second predefined value in the beacon frame to the one or more additional wireless network devices to maintain the current power mode of the one or more additional wireless network devices, in response to determining that the notification to change the current power mode should not be transmitted.

2. The method of claim 1, wherein said determining whether to transmit the notification in the beacon frame to change the current power mode further comprises detecting a successful power mode switch and determining to transmit the notification in the beacon frame to change the current power mode in the one or more additional wireless network devices in response to receiving an acceptance response to the power mode switch request from each of the one or more additional wireless network devices.

3. The method of claim 1, wherein said determining whether to transmit the notification in the beacon frame to change the current power mode further comprises detecting a failed power mode switch and determining to transmit a notification in the beacon frame to maintain the current power mode in the one or more additional wireless network devices, in response to receiving at least one rejection response to the power mode switch request from at least one of the one or more additional wireless network devices.

4. The method of claim 1, further comprising:
changing the current power mode in the first of the plurality of wireless network devices in response to receiving an acceptance response from each of the one or more additional wireless network devices; and
maintaining the current power mode in the first of the plurality of wireless network devices in response to receiving at least one rejection response from at least one of the one or more additional wireless network devices.

5. The method of claim 1, wherein said determining that the current power mode in the first of the plurality of wireless network devices in the ad-hoc wireless network should be changed further comprises:
determining that the ad-hoc wireless network comprising the plurality of wireless network devices is a continuous traffic environment;
determining that an ad-hoc power save mode is enabled in the first of the plurality of wireless network devices; and
determining that the ad-hoc power save mode can be disabled in the first of the plurality of wireless network devices.

6. The method of claim 1, wherein said transmitting the power mode switch request to the one or more additional wireless network devices of the plurality of wireless network devices comprises transmitting a first predefined value in a multicast announcement traffic indication map (ATIM) frame and transmitting a third predefined value in an initial beacon frame.

7. The method of claim 6, wherein said transmitting the first predefined value in the multicast ATIM frame further comprises transmitting the first predefined value in a power management flag in the ATIM frame.

8. The method of claim 6, wherein said transmitting the third predefined value in the initial beacon frame further comprises transmitting the third predefined value in a power management acceptance field in an independent basic service set (IBSS) parameters field in the beacon frame.

9. The method of claim 1, further comprising starting a tolerance interval in response to transmitting the power mode switch request to the one or more additional wireless network devices of the plurality of wireless network devices in the ad-hoc wireless network, wherein the tolerance interval indicates a maximum time interval during which the responses to the power mode switch request are to be received from the one or more additional wireless network devices of the plurality of wireless network devices in the ad-hoc wireless network.

10. The method of claim 9, further comprising determining the tolerance interval based on a product of a beacon interval and a number of the plurality of the wireless network devices in the ad-hoc wireless network.

11. The method of claim 1, further comprising:
determining that a tolerance interval has expired;
determining whether responses to the power mode switch request are received from each of the one or more additional wireless network devices of the plurality of wireless network devices in the ad-hoc wireless network before the tolerance interval expired;
determining whether the notification to change the current power mode should be transmitted to the one or more additional wireless network devices of the plurality of wireless network devices in the ad-hoc wireless network in response to determining that the responses to the power mode switch request are received from each of the one or more additional wireless network devices of the plurality of wireless network devices in the ad-hoc wireless network before the tolerance interval expired; and
transmitting the second predefined value in the beacon frame to the one or more additional wireless network devices in response to determining that the responses to the power mode switch request are not received from each of the one or more additional wireless network devices of the plurality of wireless network devices in the ad-hoc wireless network before the tolerance interval expired.

12. The method of claim 1, wherein said transmitting the first predefined value in the beacon frame to the one or more additional wireless network devices to change the current power mode of the one or more additional wireless network devices further comprises switching the current power mode beginning at a next beacon interval.

13. The method of claim 1, wherein the plurality of network devices are wireless local area network (WLAN) devices.

14. A wireless network device comprising:
a processor unit; and
a power management unit coupled to the processor unit and the network interface, the power management unit configured to:
determine that a current power mode in the wireless network device of a plurality of wireless network devices in an ad-hoc wireless network should be changed;
transmit a power mode switch request to one or more additional wireless network devices of the plurality of wireless network devices in the ad-hoc wireless network in response to the power management unit determining that the current power mode in the wireless network device of the plurality of wireless network devices in the ad-hoc wireless network should be changed;
determine whether to transmit, to the one or more additional wireless network devices in the ad-hoc wireless network, a notification in a beacon frame to change the current power mode based, at least in part, on one or more responses to the power mode switch request received from the one or more additional wireless network devices;

transmit a first predefined value in a beacon frame to the one or more additional wireless network devices to change the current power mode of the one or more additional wireless network devices, in response to the power management unit determining that the notification to change the current power mode should be transmitted; and transmit a second predefined value in the beacon frame to the one or more additional wireless network devices to maintain the current power mode of the one or more additional wireless network devices, in response to the power management unit determining that the notification to change the current power mode should not be transmitted.

15. The wireless network device of claim 14, wherein the power management unit configured to determine whether to transmit the notification in the beacon frame to change the current power mode further comprises the power management unit configured to detect a successful power mode switch and to determine to transmit the notification in the beacon frame to change the current power mode in the one or more additional wireless network devices in response to the power management unit receiving an acceptance response to the power mode switch request from each of the one or more additional wireless network devices.

16. The wireless network device of claim 14, wherein the power management unit configured to determine whether to transmit the notification in the beacon frame to change the current power mode further comprises the power management unit configured to detect a failed power mode switch and to determine to transmit a notification in the beacon frame to maintain the current power mode in the one or more additional wireless network devices, in response to the power management unit receiving at least one rejection response to the power mode switch request from at least one of the one or more additional wireless network devices.

17. The wireless network device of claim 14, further comprising the power management unit configured to start a tolerance interval in response to the power management unit transmitting the power mode switch request to the one or more additional wireless network devices of the plurality of wireless network devices in the ad-hoc wireless network, wherein the tolerance interval indicates a maximum time interval during which the responses to the power mode switch request are to be received from the one or more additional wireless network devices of the plurality of wireless network devices in the ad-hoc wireless network.

18. The wireless network device of claim 14, wherein the power management unit is further configured to:
determine that a tolerance interval has expired;
determine whether responses to the power mode switch request are received from each of the one or more additional wireless network devices of the plurality of wireless network devices in the ad-hoc wireless network before the tolerance interval expired;
determine whether the notification to change the current power mode should be transmitted to the one or more additional wireless network devices of the plurality of wireless network devices in the ad-hoc wireless network in response to the power management unit determining that the responses to the power mode switch request are received from each of the one or more additional wireless network devices of the plurality of wireless network devices in the ad-hoc wireless network before the tolerance interval expired; and
transmit the second predefined value in the beacon frame to the one or more additional wireless network devices in response to the power management unit determining that the responses to the power mode switch request are not received from each of the one or more additional wireless network devices of the plurality of wireless network devices in the ad-hoc wireless network before the tolerance interval expired.

19. The wireless network device of claim 14, wherein the power management unit is further configured to:
receive, at the wireless network device of the plurality of wireless network devices, a second power mode switch request from a second of the plurality of wireless network devices;
determine whether to accept the second power mode switch request;
transmit a third predefined value in a second beacon frame in response to the power management unit determining that the second power mode switch request should be accepted; and
transmitting a fourth predefined value in the second beacon frame in response to the power management unit determining that the second power mode switch request should not be accepted.

20. One or more non-transitory machine-readable storage media having instructions stored therein, which when executed by one or more processors causes the one or more processors to perform operations that comprise:
determining that a current power mode in a first of a plurality of wireless network devices in an ad-hoc wireless network should be changed;
transmitting a power mode switch request to one or more additional wireless network devices of the plurality of wireless network devices in the ad-hoc wireless network in response to determining that the current power mode in the first of the plurality of wireless network devices in the ad-hoc wireless network should be changed;
determining whether to transmit, to the one or more additional wireless network devices in the ad-hoc wireless network, a notification in a beacon frame to change the current power mode based, at least in part, on one or more responses to the power mode switch request received from the one or more additional wireless network devices;
transmitting a first predefined value in the beacon frame to the one or more additional wireless network devices to change the current power mode of the one or more additional wireless network devices, in response to determining that the notification to change the current power mode should be transmitted; and
transmitting a second predefined value in the beacon frame to the one or more additional wireless network devices to maintain the current power mode of the one or more additional wireless network devices, in response to determining that the notification to change the current power mode should not be transmitted.

21. The machine-readable storage media of claim 20, wherein said determining whether to transmit the notification in the beacon frame to change the current power mode further comprises detecting a successful power mode switch and determining to transmit the notification in the beacon frame to change the current power mode in the one or more additional wireless network devices in response to receiving an acceptance response to the power mode switch request from each of the one or more additional wireless network devices.

22. The machine-readable storage media of claim 20, wherein said determining whether to transmit the notification in the beacon frame to change the current power mode further comprises detecting a failed power mode switch and determining to transmit a notification in the beacon frame to maintain the current power mode in the one or more additional wireless network devices, in response to receiving at least one rejection response to the power mode switch request from at least one of the one or more additional wireless network devices.

23. The machine-readable storage media of claim 20, further comprising starting a tolerance interval in response to transmitting the power mode switch request to the one or more additional wireless network devices of the plurality of wireless network devices in the ad-hoc wireless network, wherein the tolerance interval indicates a maximum time interval during which the responses to the power mode switch request are to be received from the one or more additional wireless network devices of the plurality of wireless network devices in the ad-hoc wireless network.

24. The machine-readable storage media of claim 20, wherein the power management unit is further configured to:
   determining that a tolerance interval has expired;
   determining whether responses to the power mode switch request are received from each of the one or more additional wireless network devices of the plurality of wireless network devices in the ad-hoc wireless network before the tolerance interval expired;
   determining whether the notification to change the current power mode should be transmitted to the one or more additional wireless network devices of the plurality of wireless network devices in the ad-hoc wireless network in response to determining that the responses to the power mode switch request are received from each of the one or more additional wireless network devices of the plurality of wireless network devices in the ad-hoc wireless network before the tolerance interval expired; and
   transmitting the second predefined value in the beacon frame to the one or more additional wireless network devices in response to determining that the responses to the power mode switch request are not received from each of the one or more additional wireless network devices of the plurality of wireless network devices in the ad-hoc wireless network before the tolerance interval expired.

* * * * *